United States Patent [19]

Hood, Jr. et al.

[11] Patent Number: 4,896,615
[45] Date of Patent: Jan. 30, 1990

[54] HOPPER FOR DISPENSING SEED, GRAIN AND THE LIKE

[75] Inventors: Clarence E. Hood, Jr., Clemson; Thomas R. Garrett, Six Mile; Charles R. DuBose, Central, all of S.C.

[73] Assignee: Clemson University, Clemson, S.C.

[21] Appl. No.: 91,289

[22] Filed: Aug. 26, 1987

Related U.S. Application Data

[63] Continuation of Ser. No. 787,684, Oct. 15, 1985, abandoned.

[51] Int. Cl.$^4$ .................. A01C 19/02; B65D 88/26; B65D 88/68
[52] U.S. Cl. .................................. 111/177; 222/63; 222/333; 111/925
[58] Field of Search .................. 111/86, 77, 34; 222/333, 63, 216, 221, 222, 225, 226

[56] References Cited

U.S. PATENT DOCUMENTS

| | | | |
|---|---|---|---|
| 101,480 | 4/1870 | Macomber | 111/77 |
| 343,330 | 6/1886 | Moffatt | 111/77 |
| 349,460 | 9/1886 | Shaw | 111/77 |
| 418,062 | 12/1889 | Reid | 111/77 |
| 488,356 | 12/1892 | Hasson . | |
| 585,211 | 6/1897 | Johnson et al. . | |
| 611,805 | 10/1898 | Autry | 111/77 |
| 655,397 | 8/1900 | Fitzgerald et al. | 111/77 |
| 706,404 | 8/1902 | Studle . | |
| 759,247 | 2/1904 | Denyes et al. | 111/86 |
| 991,978 | 5/1911 | Hancock . | |
| 1,004,797 | 10/1911 | Lemons . | |
| 1,546,411 | 7/1925 | Short | 222/225 |
| 2,140,096 | 12/1938 | Thompson . | |
| 2,201,556 | 5/1940 | Croce | 111/77 |
| 2,432,437 | 12/1947 | Murphy . | |
| 2,566,210 | 8/1951 | Kendall et al. | 222/333 |
| 2,593,516 | 4/1952 | Alley et al. | 111/34 |
| 2,754,995 | 7/1956 | Switzer | 222/63 |
| 2,768,770 | 10/1956 | Morse et al. . | |
| 2,963,201 | 12/1960 | Westlin | 222/63 |
| 3,038,425 | 6/1962 | Hansen . | |
| 3,704,816 | 12/1972 | Gandrud | 111/77 |
| 3,915,343 | 10/1975 | Barcock . | |
| 4,116,139 | 7/1978 | Sauer | 111/82 |
| 4,254,897 | 3/1981 | Stocks . | |
| 4,296,695 | 10/1981 | Quanbeck . | |
| 4,497,265 | 2/1985 | Hood, Jr. et al. | 111/86 |
| 4,567,998 | 2/1986 | Cole et al. | 222/333 |

FOREIGN PATENT DOCUMENTS

| | | | |
|---|---|---|---|
| 83230 | 2/1955 | Denmark | 111/86 |
| 2285798 | 4/1976 | France | 111/77 |
| 1132816 | 1/1985 | U.S.S.R. | 111/77 |
| 1242018 | 7/1986 | U.S.S.R. | 111/77 |
| 609569 | 10/1948 | United Kingdom | 111/34 |
| 2024784 | 1/1980 | United Kingdom | 111/77 |

OTHER PUBLICATIONS

International Harvester Company Operator's Manual 78 Series 8/76.

Primary Examiner—Danton D. DeMille
Attorney, Agent, or Firm—Dority & Manning

[57] ABSTRACT

A hopper for dispensing seed, grain and the like comprises a housing having a lower portion and at least one dispensing opening in the lower portion; a rotatable shaft located within the housing; a drive shaft transferring rotational energy to the shaft from a low horsepower, low rpm, electric motor; a brush having a plurality of tufts of flexible bristles held in an annular member mounted on the shaft above each dispensing opening for feeding seed, grain and the like to the dispensing opening during rotation of the shaft; a marked metering plate having a metering hole therethrough and extending into a slot formed in a first side portion of the housing; and a mechanism for selectively stopping rotation of the shaft whereby when rotation of the shaft is stopped, seeds, grain and the like are blocked from access to the dispensing opening, the mechanism including a cam adjustably mounted on the shaft, a cam follower for engaging the cam and a microswitch connected to the cam follower and deactivating the electric motor to stop rotation of the shaft when the cam follower engages a predetermined point of the cam.

14 Claims, 5 Drawing Sheets

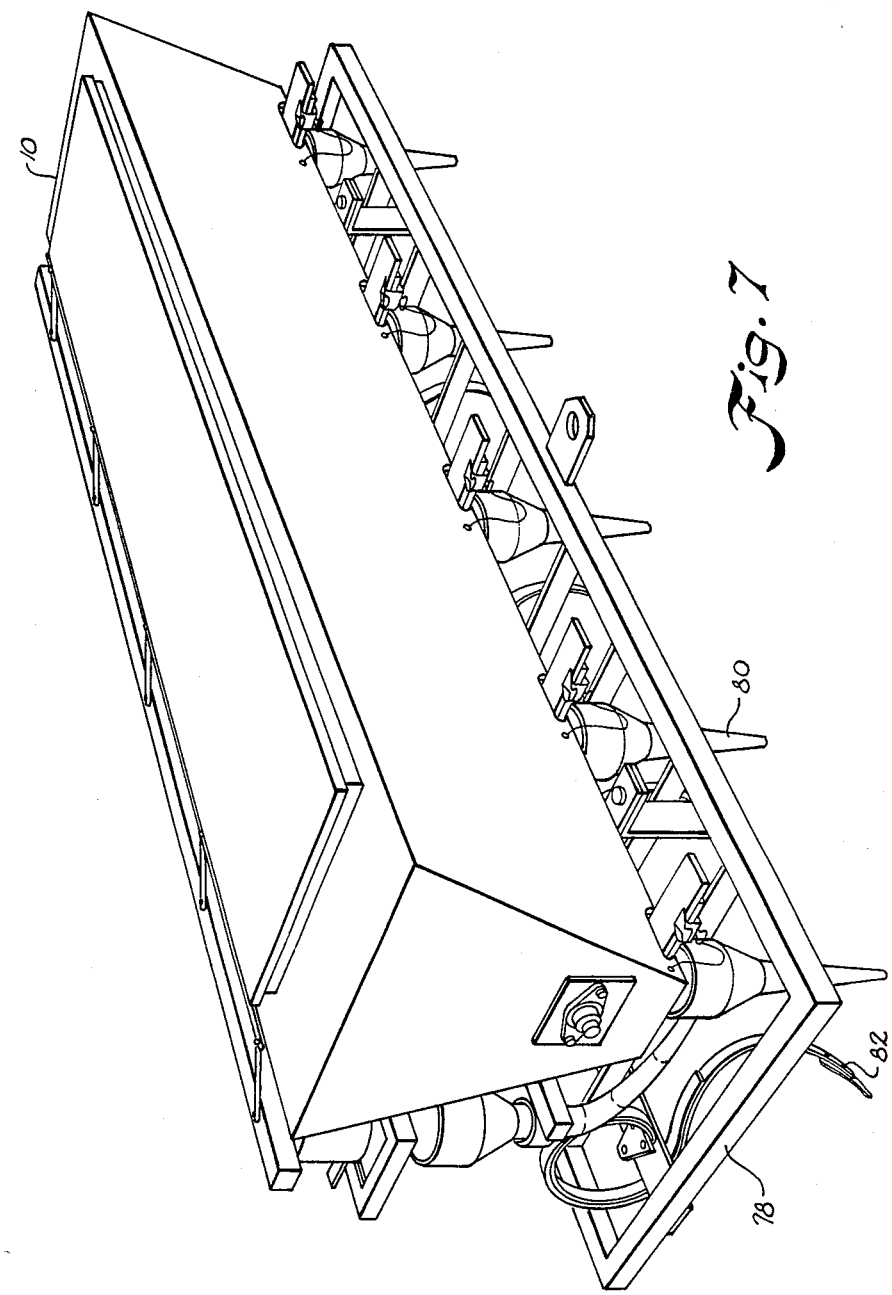

HOPPER FOR DISPENSING SEED, GRAIN AND THE LIKE

This is a continuation, of application Ser. No. 06/787,684, filed Oct. 15, 1985, which was abandoned upon the filing hereof.

BACKGROUND OF THE INVENTION

The present invention relates to a hopper for dispensing seed, grain and the like, and particularly to a hopper which agitates and translocates the seed, grain or the like to the dispensing opening with a metering implement.

There are numerous types of seed dispensing devices. One type has a plurality of dispensing outlets which are calibrated by a single metering mechanism. Another type of seeding implement is disclosed in U.S. Pat. No. 4,497,265 to the inventors of the present invention, which patent is hereby incorporated herein by reference. In such devices, a plurality of side-by-side containers are provided with individual metering mechanisms in combination with soil tilling equipment to permit interseeding of pasture or other land with very small, controlled quantities of seed. For example, as low as two pounds of clover seed is applied per acre of existing fescue, coastal Bermuda or the like.

Yet another type has a rigid member for pushing seed toward the hopper outlet, while other types employ a brush of one kind or another to move seed inside a hopper, either for cleaning or dispensing. A still further type has stirring arms inside the hopper, and these arms are driven by power supplied from the axle of the wheels which carry the device over the fields. The latter type is known as a "ground driven" device, and an example of a ground driven device is shown in U.S. Pat. No. 488,356 to Hasson.

Generally, hoppers of simple and inexpensive construction tend to be limited to a narrow range of seeding applications. Seeders capable of a broader range of seeding applications generally tend to be of more complex construction and greater expense. Moreover, when the particular features of simpler hoppers are combined in a hopper of more complex design, the combination of features often results in unanticipated adverse consequences. For example, adding a seed metering feature to a ground-driven hopper complicates the task of calibrating the metering feature. It is difficult to calibrate the metered opening of a ground-driven device, because the dispensing action only occurs when the device is moving through the field. Moreover, such devices are also difficult to calibrate when used to seed uneven terrain.

Another type of seed dispensing hopper has an electric motor driven metering implement which has rigid members rotating about the driven shaft inside the hopper. These rigid rotating members constitute a potential hazard to an operator who might place his hand into the hopper while the shaft is rotating.

Other calibration problems stem from hopper manufacturing methods. Hoppers generally are fabricated from a lightweight metal which is bent, drilled, and formed into the desired configuration, and then welded together. The bending, drilling, forming and welding produces distortions in the final manufactured hopper, and these distortions make it difficult to calibrate any metering mechanism for controlling the dispensing of seed from the hopper.

OBJECTS AND SUMMARY OF THE INVENTION

It is a principal object of the present invention to provide an improved hopper for dispensing seed, grain or the like that is simple to operate, easy to manufacture and repair, and affordable for purchase by a broad spectrum of farmers, while being adaptable to a broad range of seed, grain and the like to permit the dispensing of same over a wide range of dispensing rates with little or no seed wasted during or after the dispensing operation.

Another object of the present invention is to provide a hopper for dispensing seed, grain or the like that is adaptable to controlled simultaneous dispensing of different varieties of seed requiring widely differing application rates.

It also is an object of the present invention to provide an apparatus for dispensing seed, grain or the like that is adaptable to be used in conjunction with existing seeder/renovator devices.

Yet another object of the present invention is to provide an improved method for fabricating an improved hopper for dispensing seed, grain or the like that permits a simple and reliable calibration of the metered dispensing device of the hopper.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the hopper for dispensing seed, grain and the like of the present invention comprises a housing having a lower portion and at least one dispensing opening in the lower portion, a rotatable shaft located within the housing, means for rotating the shaft, flexible metering means mounted on the shaft above each dispensing opening for agitating seed, grain and the like and for translocating same to the dispensing opening during rotation of the shaft, and means for selectively stopping rotation of the shaft, whereby when rotation of the shaft is stopped by the selective shaft rotation stopping means, seeds, grain and the like are blocked from access to the dispensing opening.

In the preferred embodiment of the present invention, the means for rotating the shaft includes an electric motor supplying about 60 rpm's at approximately one quarter horse power or less to rotate the shaft inside the housing. The drive shaft of the motor is preferably connected to the shaft inside the housing via a reduction gearing mechanism, but may be directly connected. The preferred ratio of the reduction gearing is 3 to 1 so that the shaft inside the housing rotates at about 20 rpm's.

Other contemplated embodiments of the means for rotating the shaft include a clutch mechanism which engages the shaft with a drive shaft of a farm implement. The drive shaft engaged by the clutch can be a rotating axle of a farm vehicle on which the hopper is mounted or a shaft driven by an hydraulic motor or an internal combustion engine.

The preferred embodiment of the flexible metering means of the invention is a brush having at least three circumferential rows of discrete tufts of bristles secured in an outer circumferential surface of an annular cylindrical member. The tufts of each circumferential row of bristles are arranged side-by-side with the tufts in the next adjacent row. In addition to translocating the seed or the like, the rotating brush agitates the seed and orders it so that it can be presented to the dispensing opening in a uniform flow orientation with adjacent seed particles.

The preferred embodiment of the means for selectively stopping rotation of the shaft according to the present invention includes a cam mounted on the shaft, a cam follower mounted to engage the cam, and switch means connected to the follower whereby the switch means is activated when the follower engages a preselected point on the cam. It is contemplated that the preselected point of the cam for activation of the switch means is the highest point of the cam. In this preferred embodiment, the cam and cam follower are mounted so that when the cam follower reaches the high point of the cam, three tufts of the brush will be positioned in a line crossing the dispensing opening with the middle tuft directly over and into the dispensing opening, and the other two tufts straddling the dispensing opening. Accordingly, activation of the switch means stops rotation of the shaft when the bristles of the brush are so positioned.

The preferred embodiment of the switch means of the present invention is a microswitch attached to the cam follower and activated by same. The microswitch forms a parallel circuit with an on/off switch which controls the electric motor being used to rotate the shaft of the hopper.

In the preferred embodiment of the invention, a metering plate having a metering hole formed therethrough is provided. The housing of the preferred embodiment has a first side portion extending substantially transversely relative to the lower portion and having at least one slot extending therethrough and positioned in alignment with the dispensing opening. One end of the first side portion attaches to one end of a bottom portion which extends substantially parallel to the lower portion. The slot is positioned above the attachment point of the bottom and side portion by a distance approximately equal to the thickness of the bottom portion. The metering plate can be slid through the slot, and the metering hole can be moved into varying degrees of alignment with the dispensing opening to meter, i.e., regulate, the flow of seed or the like from the hopper. In the preferred embodiment of the invention, the metering plate has a metering hole that is shaped substantially like a cone, and the radius of curvature of the larger end of the conically-shaped metering hole is approximately one half inch, which is the preferred radius of the dispensing opening.

In the preferred embodiment of the present invention, means are provided for calibrating the degree of alignment between the dispensing opening and the metering hole. Means also are provided for preventing the metering plate from sliding relative to the dispensing opening during operation of the hopper to dispense seed or the like.

The preferred embodiment of the means for calibrating the degree of alignment between the dispensing opening and the metering hole includes a series of index marks on the upper surface of one end of the metering plate opposite the end having the metering hole, and an indicator mark on a side flange of a spacer plate on which the metering plate rests. The indicator mark is calibrated with the index marks to determine the extent to which the metering hole aligns with the dispensing opening.

The preferred embodiment of the means for preventing sliding movement of the metering plate during dispensing of seed or the like from the hopper includes a resilient clip which applies pressure against the metering plate and the support plate which is attached to a bottom portion of the housing and supports the spacer plate thereon. The friction between the metering plate and the spacer plate is sufficient under the pressure applied by the clip to prevent the metering plate from sliding relative to the spacer plate which is fixed atop the upper surface of the support plate.

Preferably, the thickness of the spacer plate is approximately equal to the thickness of the bottom portion so that the metering plate slides easily over the spacer plate and through the slot in the first side portion of the housing.

When a cylindrical brush is used in the preferred embodiment, the lower portion of the housing has a semicircular contour which assists in translocating the seed toward the dispensing opening as the brush rotates. The lower portion further has a substantially flat milled grooved portion surrounding the dispensing opening. The metering plate extends through the housing slot and into the groove of the lower portion and between the lower portion and the bottom portion of the housing. The metering plate is movable back and forth through the housing slot and the groove for varying the degree of alignment between the metering hole and the dispensing opening.

It also is contemplated that a preferred embodiment of the hopper defines a number of separate compartments by the use of one or more dividing walls. In this multiple dispensing embodiment, each compartment has its own dispensing opening, metering brush, metering plate and hole, etc. In this way, different varieties of seed or the like having different application requirements can be applied to the soil during a single passage of the hopper over the area to be seeded.

In one embodiment of the invention, the hopper is mounted on a frame with each dispensing opening above a seed funnel which also is mounted on the frame. A tine is mounted on this frame in alignment with each seed funnel. The tine comprises a flexible main shank having an inner reinforcing coil spring overlying this main shank at the top portion thereof and a reversible shovel attached to the free end of the bottom portion of the flexible main shank.

The present invention also embodies a method for making the hopper that facilitates a reliable calibration of the metering means. The method comprises assembling the housing of the hopper by bending and welding sheets of metal and plastic into the desired hopper housing structure, including a slot in the first side portion thereof; attaching a support plate to the bottom portion of the housing with a spacer plate thereon flush with the lower edge of the slot; inserting the metering plate into the housing slot until the larger end of the metering hole is aligned with the dispensing opening; inserting a bolt having a cross section just a bit smaller than the cross section of the dispensing opening, through the dispensing hole and the metering hole; and attaching the side flange to the support plate such that the indicator mark of the side flange is aligned with one of the index marks of the metering plate.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 7 is a perspective view of an embodiment of the present invention mounted for operation with an embodiment of a renovator/seeder combination.

DESCRIPTION OF THE PREFERRED EMBODIMENTS

Reference will now be made in detail to the present preferred embodiments of the invention, examples of which are illustrated in the accompanying drawings.

Figure 1:
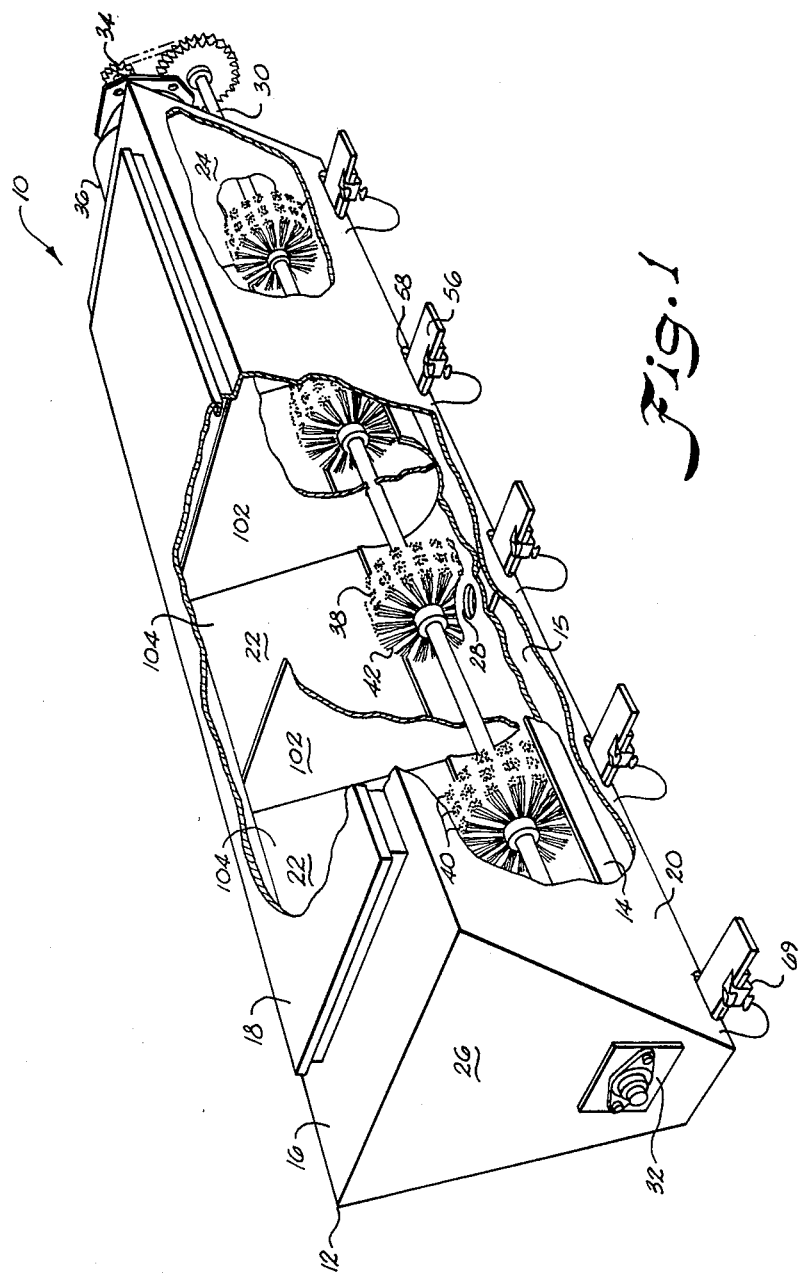
FIG. 1 is a perspective, partial cut-away view of the preferred embodiment of the present invention.

The preferred embodiment of the hopper for dispensing seed, grain or the like is shown in FIG. 1 and is represented generally by the numeral 10. The hopper of the present invention comprises a housing having a lower portion and at least one dispensing opening in the lower portion thereof. As embodied herein and shown for example in FIGS. 1 and 2, a housing 12 defines an enclosure having a lower portion 14, a bottom portion 15, an upper portion 16, a lid portion 18, a first side portion 20, a second side portion 22, a first end portion 24, and a second end portion 26. First and second side portions 20, 22 extend substantially transversely relative to lower portion 14 of housing 12, and bottom portion 15 extends substantially parallel to lower portion 14. Bottom portion 15 has formed therein a bottom opening 27, as shown for example in FIGS. 2-5. The shape and size of bottom opening 27 is relatively unimportant so long as bottom opening 27 does not interfere in any way with the flow of seed through the dispensing opening (described below) of lower portion 14. Accordingly, bottom opening 27 normally is fabricated to be much larger than the dispensing opening so as not to impose any stringent fabrication tolerances on this feature of the hopper.

In the preferred embodiment of the present invention, lower portion 14 is mounted, as by bolts, on bottom portion 15 of housing 12 and extends from first side portion 20 to second side portion 22 along the length of housing 12. In the preferred embodiment of lower portion 14, shown for example in FIGS. 2 and 3, a semicylindrical section of a length of six inch diameter polyvinylchloride schedule 40 pipe is used. When lower portion is mounted to form part of housing 12, the edges of lower portion 14 contact first and second side portions 20, 22 and first and second end portions 24, 26, to prevent any seed, grain or the like from escaping from the hopper through any housing slot 58 (described below) or rear housing slot 59 (described below). Lower portion 14 also can be mounted by attaching its sides to side portions 20, 22 instead of attaching its bottom to bottom portion 15. Moreover, lower portion 14 can be removed from inside the hopper without first removing either brushes 38 or shaft 30. This facilitates changing the lower portion, if a lower portion of different configuration is desirable for a particular seeding application.

First and second side portions 20, 22, bottom portion 15 and first and second end portions 24, 26 of housing 12 are preferably fabricated out of a lightweight metal, but plastic or any other rigid lightweight sturdy material can be used. A 16 gauge sheet metal is a suitable material for fabricating these portions of the housing.

As further embodied herein and shown for example in FIGS. 1–5, lower portion 14 has at least one dispensing opening 28 therein. Preferably, dispensing opening 28 is circular with a one inch diameter.

The hopper of the present invention has a rotatable shaft located within the housing. As embodied herein and shown for example in FIGS. 1, 2, 4 and 5, a shaft 30 extends lengthwise inside housing 12. Respective ends of shaft 30 are mounted in first and second end portions 24, 26 of housing 12. The manner of adjustably fixing bearing mounting 32 to end portion 26 can be accomplished by an conventional means. For example, the end bolts of bearing mounting 32 can be passed through vertically oriented slots (not shown) in end portion 26 and washers and nuts can be provided for the ends of the bolts extending into housing 12 so that mounting bearings 32 can be raised or lowered to any particular height by tightening the washers and nuts after moving bolts up or down within the confines of the vertically aligned slots. As shown in FIG. 1, one end of shaft 30 is rotatably mounted in a bearing mounting 32 which is adjustably fixed to second end portion 26 of housing 12. The other end of shaft 30 is also rotatably mounted in a similar bearing (not shown) which is adjustably fixed to first end portion 24 of housing 12. Bearing mountings 32 are adjustable to permit shaft 30 to be raised or lowered relative to lower portion 14 of housing 12. Shaft 30 can be formed of any sturdy rigid material formed in the shape of a rod that can be rotated as required by the invention. A ¾ inch diameter steel rod is used in the preferred embodiment of the invention.

In accordance with the present invention, means are provided for rotating the shaft. As embodied herein and shown for example in FIG. 1, the means for rotating the shaft comprises a drive shaft 34 which is driven by a motor 36. The lengths of shafts 30, 34 have been exaggerated in FIG. 1 in order to accommodate the perspective view shown in FIG. 1, in which motor 36 is partially obscured. Drive shaft 34 can be an extension of the armature of motor 36.

Preferably, motor 36 comprises a 12 volt D.C. electric motor, such as an automotive windshield wiper motor, which produces 60 rpm's at less than one quarter horsepower. Thus, the power requirements for driving the metering implement which moves the seed towards the dispensing opening inside the hopper of the present invention are relatively low. Some conventional apparatus require significant amounts of horsepower to drive the metering implement which translocates and agitates the seed inside the hopper.

A three to one gearing reduction is preferably provided so that shaft 30 is driven at approximately 20 rpm's. Preferably, motor 36 is reversible and can drive shaft 30 in either a clockwise or counterclockwise direction, as desired.

Other suitable means for rotating the shaft includes an hydraulic motor, an internal combustion engine, or a clutch and gearing mechanism which drives the shaft from the rotation of the wheels of the vehicle transporting the hopper over a field to be seeded. However, so-called ground driven power is less desirable because of the unpredictable terrain over which the vehicle passes and the varying rpm's supplied to the shaft. These variations in rpm for the shaft complicate the calibration of the dispensing rate of the hopper.

In accordance with the present invention, flexible metering means are provided and mounted on the shaft above each dispensing opening for agitating seed, grain and the like and for translocating seed, grain and the like to the dispensing opening during rotation of the shaft. As embodied herein and shown for example in FIGS. 1, 2, 4 and 5, the flexible metering means comprises a brush 38 mounted on shaft 30 for rotation with shaft 30. Brush 38 preferably comprises an annular cylindrical member 39 having at least three circumferential rows of discrete tufts 40 of flexible bristles 42 around the outer circumference thereof. Each brush 38 is mounted on shaft 30 so that as shaft 30 and brush 38 rotate, bristles 42 of each tuft 40 on each brush 38 will bend slightly as bristles 42 traverse dispensing opening 28 of housing 12. Adjustable bearing mounts 32 facilitate accomplishing this spatial relationship between the dispensing opening and the bristles of brush 38.

In addition, cylindrical annular members 39 of brushes 38 can comprise two semicylindrical portions joined by set screws. In such a configuration, the brushes can be removed from shaft 30 without disassembling shaft 30 from mountings 32. This feature would facilitate changing brushes with different bristle or tuft designs and patterns over the circumferential surface of cylindrical member 39, if such different configurations were found to be useful for particular seeding applications.

Moreover, if the traversing of bristles 42 against lower portion 14 near dispensing opening 28 causes bristles 42 to wear, then shaft bearing mounts 32 can be adjusted to maintain the desired slight bending of The construction of the preferred embodiment of the brush of the present invention constitutes a safer metering implement for the operator of the hopper than alternative brush constructions. This is because there are no rigid structures projecting beyond the surface of annular cylindrical member 39. Only the bristles project beyond the outer circumferential surface of annular member 39. These flexible bristles enable the operator to place his hands inside the hopper during operation of the flexible metering implement without fear of personal injury.

In accordance with the present invention, means are provided for selectively stopping rotation of the shaft, whereby when rotation of the shaft is stopped by the selective shaft rotation stopping means, seeds, grain and the like are blocked from access to the dispensing opening. As embodied herein and schematically shown for example in FIGS. 4 and 5, the selective shaft rotation stopping means comprises a cam 46 mounted on an adjustable sleeve 47 on shaft 30, a cam follower 48 mounted to engage cam 46, and switch means connected to the follower whereby the switch means is activated when the follower engages a preselected point of cam 46.

Preferably, the switch means comprises a microswitch 50 which is closed and opened according to down (FIG. 4) or up (FIG. 5) positioning, respectively, of a follower arm 54 connected to cam follower 48. Microswitch 50 is electrically connected in parallel with an on/off switch 52 of motor 36.

Figure 4:
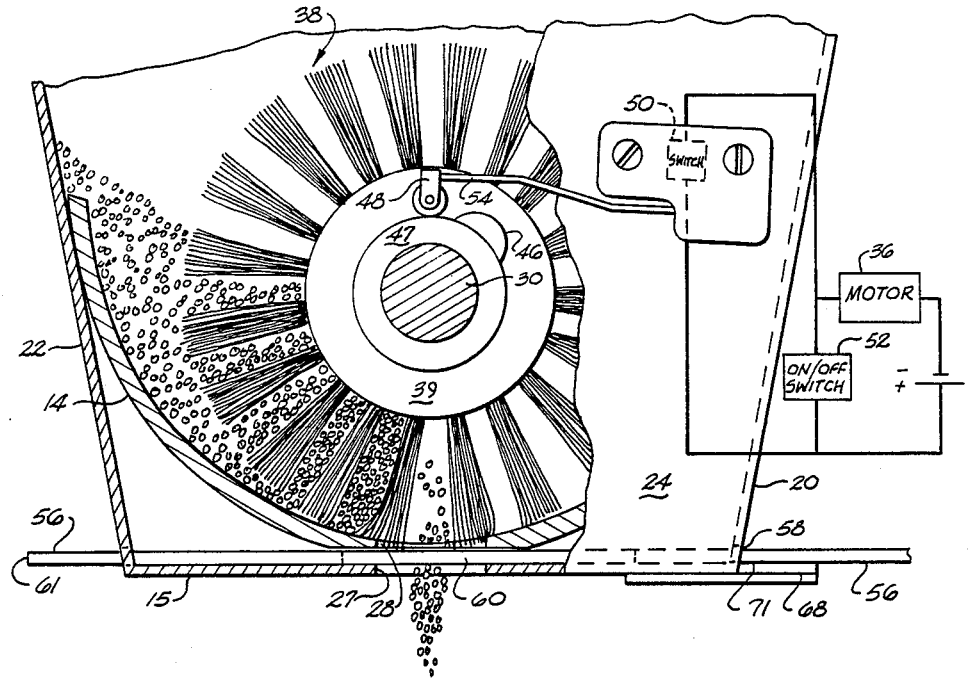
FIG. 4 is a schematic view of several components of the preferred embodiment of the present invention operating in the seed dispensing mode.
Figure 5:
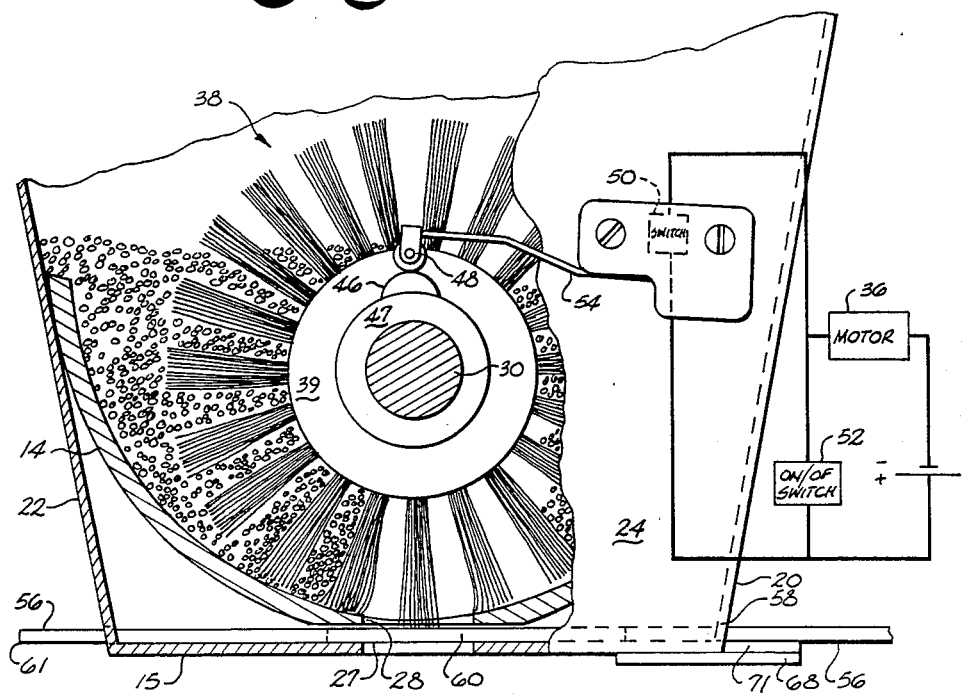
FIG. 5 is a schematic view similar to that of FIG. 4 except that in FIG. 5 rotation of the brush and dispensing of seeds has ceased.

Microswitch 50 is normally closed when cam follower 48 is not engaging cam 46. This condition is shown in FIG. 4 in which brush 38 is rotating in a counterclockwise direction as brush 38 and shaft 30 are being rotated by motor 36 (shown schematically). If the operator opens on/off switch 52 of motor 36, electric power continues to be supplied to motor 36, because microswitch 50 normally is in a closed condition. However, when follower 48 engages cam 46 and attains the highest point on cam 46, as shown in FIG. 5, follower arm 54 moves up in such a way as to open microswitch 50. Once microswitch 50 is opened at the same time that on/off switch 52 is open, power no longer is supplied to motor 36, and accordingly motor 36 stops, shaft 30 stops rotating, and brush 38 also stops rotating. Because of the low rpm's of shaft 30, brush 38 stops essentially the instant that power is cut off to motor 36.

The position of cam follower 48, cam 46, follower arm 54, and microswitch 50 are so arranged relative to tufts 40 of brush 38, that follower 48 will attain the highest point on cam 46, and accordingly follower arm 54 will open microswitch 50, at precisely a point at which a tuft 40 from the center row of tufts of brush 38 will be positioned directly over dispensing opening 28. This condition is shown in FIG. 5 in which all rotation of brush 38 has ceased and follower 48 has attained the highest point of cam 46 with the result that microswitch 50 has been opened simultaneously with opening of on/off switch 52 by an operator. Notice in FIG. 5 that the tufts on either side of the tuft which is positioned over dispensing opening 28, serve to block any grain which may be present inside hopper housing 12 from access to dispensing opening 28. The tufts shown in FIGS. 4 and 5 are all in the center row of brush 38. Though not depicted in FIG. 5, the tufts in adjacent rows on each side of the center row of brush 38, also serve to block grain from access to dispensing opening 28.

In the preferred embodiment of the invention, brush 30 has three parallel circumferential rows of tufts of bristles. Each tuft is in line with a corresponding tuft of the adjacent circumferential row of tufts. Thus, whenever a single tuft in the center row is directly over dispensing opening 28, there are eight next adjacent tufts around this centrally positioned tuft. This arrangement affords excellent blockage characteristics for preventing grain from having access to dispensing opening 28.

If brush 38 has only two parallel rows of tufts of bristles, it is recommended that the brush be mounted so that the two rows of bristles straddle dispensing opening 28 and that cam 46 be adjusted so that brush 38 will stop when dispensing opening 28 is surrounded by four tufts of bristles. In such two-row brush embodiments, no single tuft will be positioned directly over dispensing opening 28 when brush rotation has ceased.

The coordinated stopping of the hopper metering implement ensures that wasteful dispensing of seed can be prevented for a variety of brush configurations. Different brush configurations can be adapted to dispense different kinds of seeds and at differing rates. As long as the brush has a single portion of densely packed bristles that can be coordinated to stop over the dispensing opening by the selective stopping means of the invention, the operator is free to vary the brush density over the remaining portion of the brush, in any way that suits the particular seeding application of interest to the operator.

The hopper of the present invention also includes a metering plate having a metering hole formed therethrough, wherein the housing has a first side extending substantially transversely relative to the lower portion and having at least one slot extending therethrough and positioned in alignment with the dispensing opening, and wherein the metering plate extends through this slot and is movable through this slot for varying the degree of alignment between the metering hole and the dispensing opening. As embodied herein and shown for example in FIGS. 2 and 3, a metering plate 56 comprises a rectangular plate measuring approximately 13 inches long, two inches wide, and one eighth inch thick. A housing slot 58 is formed in first side portion 20 near bottom portion 15 of housing 12 as shown in FIG. 3. Plate 56 is preferably formed of polyvinylchloride (PVC). However, plastic of a different kind or metal also is suitable material for metering plate 56.

As shown in FIG. 3, metering plate 56 has formed therethrough a metering hole 60 which is preferably formed in a conical shape. The larger end of the cone is fabricated by initially drilling a circular hole through plate 56 of the same diameter as dispensing opening 28. Then, a second hole is drilled spaced apart from the first and using a one eighth inch diameter drill bit. The conically shaped hole is then formed by milling out the plate between the two circular holes until a conically shaped hole is formed measuring approximately four and one sixteenth inches long and tapering from a one half inch radius of curvature at the larger end to a one sixteenth inch radius of curvature at the smaller end of metering hole 60.

Metering plate 56 is inserted through slot 58 until metering hole 60 substantially aligns with dispensing opening 28 so that seed, grain or the like can flow through metering hole 60 after flowing through dispensing opening 28.

Figure 2:
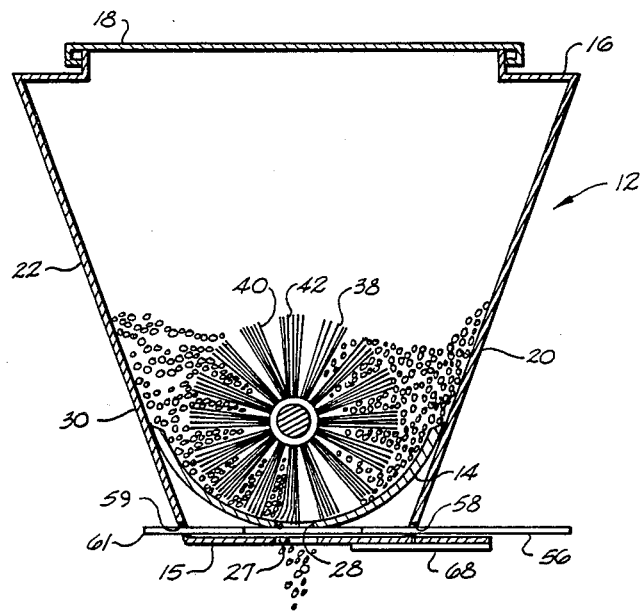
FIG. 2 is a cross-sectional view of the preferred embodiment of the present invention taken along the imaginary plane through the center row of tufts of one of the brushes shown in FIG. 1.
Figure 3:
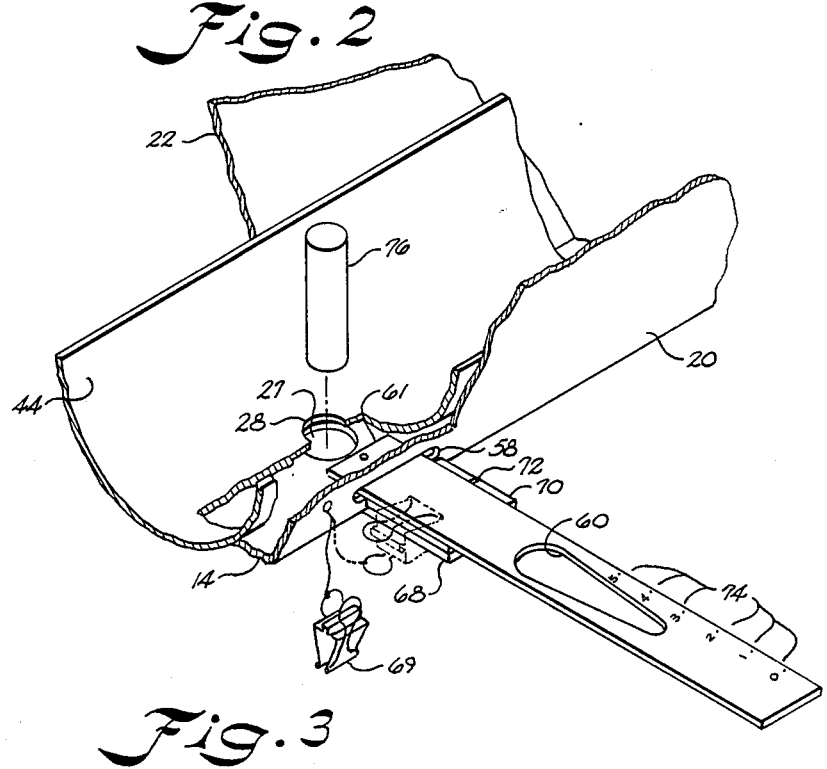
FIG. 3 is a partial cut-away perspective view of several components of the preferred embodiment of the present invention.

As shown in FIG. 2, a rear housing slot 59 is formed in second side portion 22 of housing 12 to enable metering plate 56 to pass completely through housing 12, if required. Thus, metering plate 56 can extend completely through housing 12 by entering through housing slot 58 and exiting through rear housing slot 59.

Figure 6:
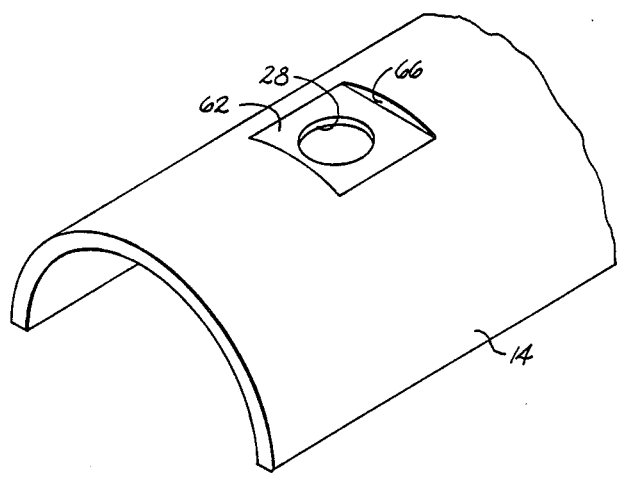
FIG. 6 is a perspective partial view of a component of the preferred embodiment of the present invention.

As shown in FIG. 3, in the preferred embodiment of the invention, metering plate 56 slides between lower portion 14 and bottom portion 15 of housing 12 such that metering plate 56 slides over bottom portion 15 and under lower portion 14. Moreover, as shown in FIG. 6, lower portion 14 has a flat milled portion forming a groove 62 approximately two inches wide to accommodate metering plate 56 and surrounding dispensing opening 28. A lip 66 is accordingly formed on two sides of dispensing opening 14 and flat milled portion 62. In the preferred embodiment, this lip measures approximately one eighth inch in height at its highest portion so that when the one eighth inch thick metering plate rests within groove 62, there will be a flush fit with lower portion 14 of housing 12.

The hopper of the present invention comprises calibrating means for calibrating the degree of alignment between the dispensing opening and the metering hole of the metering plate. As embodied herein and shown for example in FIGS. 1-5, the calibrating means comprises a support plate 68 attached to bottom portion 15 of housing 12. A spacer plate 71 is attached to the upper surface of support plate 68, and the upper surface of spacer plate 71 is flush with the lower edge of housing slot 58. As shown in FIGS. 2, 4 and 5 for example, the lower edge of slot 58 is approximately flush with the surface of bottom portion 15 facing inside the hopper, and the thickness of spacer plate 71 is equal to the thickness of bottom portion 15 so that metering plate 56 will slide smoothly atop spacer plate 71 and through housing slot 58 and across the inside facing surface of bottom portion 15.

As shown in FIG. 3 for example, a side flange 70 is attached atop one edge of spacer plate 71 and extends above the upper surface of spacer plate 71 by approximately the thickness of metering plate 56, which is one eighth inch in the preferred embodiment. On the top edge of side flange 70 is an indicator mark 72. A plurality of index marks 74 are formed along the upper surface of one end of metering plate 56. Index marks 74 are used in conjunction with indicator mark 72 of side flange 70 to calibrate the degree to which metering hole 60 is aligned with dispensing opening 28.

Different degrees of alignment result in different metering rates depending on the characteristics of the seed being dispensed. Once the desired alignment is attained for a particular kind of seed, plate 56 is prevented from sliding from this setting by applying some means for preventing plate 56 from sliding.

In further accordance with the hopper of the present invention, means are provided for preventing sliding movement of the metering late. As embodied herein and shown for example in FIGS. 1 and 3, the means for preventing sliding movement of the metering plate includes a resilient clip 69 for applying pressure against the metering plate and the support plate. Clip 69 is preferably a spring biased clip as shown in FIG. 3 and is capable of applying sufficient pressure to prevent plate 56 from sliding either into or out of housing slot 58 during dispensing operation of the hopper.

A preferred embodiment of the hopper of the present invention includes one or more dividing walls 102 as shown for example in FIG. 1. Dividing walls 102 separate housing 12 into a plurality of different compartments 104. Each compartment 104 contains all of the features of the preferred embodiment of the invention, including a dispensing hole 28, a bottom opening 27, a rotatable shaft 30, a brush 38, slots 58, 59, metering plate 56, etc. Using this multiple compartment embodiment of the invention, it is possible to simultaneously plant a plurality of different kinds of seed, grain or the like by placing each kind of seed in its own compartment having its own brush design and calibrating the corresponding metering plate for optimum dispensing of that particular seed, grain or the like.

This flexibility is especially desirable when planting seeds having very different characteristics and application requirements. For example, if it is desired to simultaneously plant a field of fescue and rye, these two types of seed are very different. Fescue has a volumetric measure of about 14 pounds per bushel and is commonly applied at a rate of about 15 pounds per acre. Rye on the other hand has a volumetric measure of about 60 pounds per bushel and is commonly applied to a field at the rate of about 90 pounds per acre. Moreover, the shape of the two types of seed are somewhat different, and this fact alone requires different settings of the respective metering plates to obtain the optimum dispensing rates for both kinds of seed. Thus, the present invention affords the farmer an inexpensive seed dispensing apparatus which nonetheless has the flexibility needed to simultaneously plant very different kinds of seed.

Another advantage of the present invention is the ability to calibrate each compartment 104 while the hopper is stationary. Most conventional hoppers have a ground-driven seed dispensing mechanism which operates only when the hopper is being pulled behind the tractor across the field to be planted. This presents a difficult problem of trying to calibrate the dispensing rate of the seed, because the seed being dispensed must be caught and measured as the hopper is moving. This calibration problem is compounded further if different varieties of seed are to be dispensed from separate compartments of the hopper. Moreover, the dispensing action of any agitating implement inside the hopper occurs in proportion to the speed at which the hopper is being pulled across the field. This factor further complicates the task of calibrating the metering means of the hopper. If the hopper is being pulled at a faster rate than the rate at which the calibration was performed, then the dispensing rate may vary from the calibrated rate, and either too much or too little seed will be dispensed.

In further accordance with the present invention, a method is provided for fabricating the hopper of the present invention in a simple and inexpensive manner, yet a method that permits reliable calibration of the metering means of the hopper. The method of the present invention comprises assembling the housing by bending, drilling, bolting and welding sheets of metal and PVC to form a housing as shown for example in FIGS. 1, 2 and 3. Support plate 68 is then welded to bottom portion 15 of housing 12 with spacer plate 71 flush with the lower edge of housing slot 58. Metering plate 56 is then inserted into housing slot 58 until the larger end of metering hole 60 aligns with dispensing opening 28. A bolt 76 having a cross-section just less than the cross-section of the dispensing opening, is inserted through the dispensing opening and the metering hole. As embodied herein and shown for example in FIG. 3, bolt 76 is about to be inserted through dispensing opening 28, and metering plate 56 is about to be slid through slot 58 and between lower portion 14 and bottom portion 15 and into groove 62 of lower portion 14 until metering hole 60 is disposed between bottom opening 27 and dispensing opening 28. Bolt 76 is inserted through each of bottom opening 27, metering hole 60 and dispensing opening 28. As metering plate 56 is held in this position, side flange 70 is permanently attached, as by welding, and fixed to spacer plate 71 in a position such that indicator mark 72 of side flange 70 is aligned with one of index marks 74 of metering plate 56.

This method of calibrating the degree to which metering hole 60 is aligned with dispensing opening 28 has several advantages over other methods of fabricating and calibrating devices for regulating seed flow from a seed hopper. For example, distortions of the metal occurring during fabrication of the hopper cannot affect the calibration of the seed dispensing metering means, since the calibration is performed only after all such distortions have occurred. This method of assembling the hopper simplifies the procedure for calibrating the metering plate and accordingly reduces the expense of performing this calibration during manufacture of the hopper. In addition, manufacturing and assembly tolerances for the different parts used in assembly of the hopper can be greater without adversely affecting the ability to calibrate the metering device. This greater flexibility in manufacturing tolerances significantly reduces the cost of manufacture.

A further preferred embodiment of the hopper of the present invention includes a frame for mounting the hopper thereon, a seed funnel mounted on the frame underneath each dispensing opening of the hopper housing, and a tine mounted on the frame in alignment with each seed funnel, the tine comprising a flexible main shank having a top portion and a bottom portion, an inner reinforcing coil spring overlying the top shank portion, and a reversible shovel attached to the shank bottom portion at the free end thereof.

Figure 8:
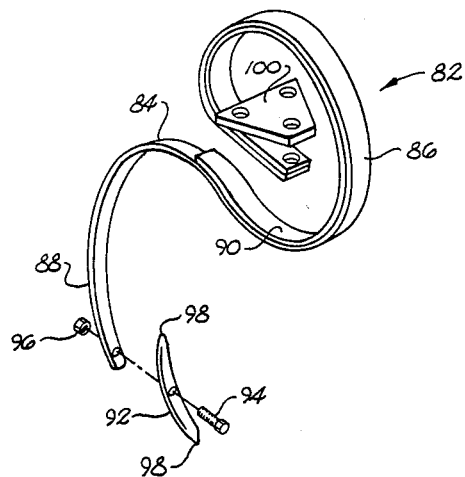
FIG. 8 is a perspective view of an embodiment of a flexible tine used in the renovator/seeder combination of FIG. 7.

As embodied herein and shown for example in FIGS. 7 and 8, an embodiment of the present invention, hopper 10, is mounted atop a frame 78. A seed funnel 80 is mounted on frame 78 under each dispensing opening (not shown) of hopper 10. A tine 82 is mounted on frame 78 in line with each seed funnel 80.

Tine 82 comprises a flexible main shank 84 having a top portion 86 and a bottom portion 88 integral with top portion 86. Tine 82 further comprises an inner reinforcing coil spring 90 which overlies top shank portion 86 and is fixed at one end thereto, as by a bolted clamping plate 100, to support same. A reversible shovel 92 forms part of tine 82 and is attached to same at the free end of bottom shank portion 88 with a threaded screw 94 and a threaded nut 96. Shovel 92 has a point 98 at each end thereof. When one point wears out, the nut and bolt can be loosened and shovel points 98 reversed in their position on bottom portion 88 of shank 84. Tine 82 further comprises clamping plate 100 which facilitates attaching tine 82 to frame 78 as shown in FIGS. 7 and 8. Tine 82 is attached to frame 78 such that bottom shank portion is far enough away from seed funnel 80 that when bottom shank portion 88 encounters an obstruction in the soil, bottom shank portion 88 cannot flex far back enough to strike seed funnel 80.

Tine 82 and coil spring 90 are formed of strips of spring steel and accordingly are flexible. Tine 82 will vibrate when bottom shank portion 88 and shovel 92 engage the soil. The vibrating tine opens furrows and projects loose soil into the air while hopper 10 dispenses seed into seed funnel 80 and seed funnel 80 directs the seed into the furrow created by tine 82. Just about the time that the seed has been directed into the furrow made by tine 82, the loose soil projected into the air by the vibrating action of tine 82, falls back and covers the seed. Tine 82 also sheds trash and most other obstructions as it moves through the soil and creates the furrow. The vibrating action of tine 82 is enhanced by reinforcing coil spring 90, because most of the vibratory motion is concentrated on bottom shank portion 88 which is not supported by coil spring 90.

The hopper of the present invention can be used in conjunction with a seeder/renovator of the type shown in FIGS. 7 and 8 to plant small grains such as oats, wheat and rye, at rates up to at least four bushels per acre. In addition, the hopper of the present invention is flexible enough to be suitable for planting fescue, orchardgrass, millet and other crops at seeding rates of from approximately 10 pounds per acre to higher rates of about 100 pounds per acre. Thus, the hopper of the present invention is potentially capable of functioning as a conventional grain drill, yet at a significantly reduced purchase price from conventional drills because of the simplicity, versatility and ease of construction of the present invention.

It will be apparent to those skilled in the art that various modifications and variations can be made in the hopper of the present invention without departing from the scope or spirit of the invention. Thus, it is intended that the present invention cover the modifications and variations of this invention provided they come within the scope of the appended claims and their equivalents.

What is claimed is:

1. A hopper for dispensing seed, grain and the like, the hopper comprising:
   a housing having a lower portion and at least one dispensing opening in said lower portion;
   a rotatable shaft located within said housing;
   means for rotating said shaft;
   flexible metering means mounted on said shaft above each said dispensing opening for agitating seed, grain and the like and for translocating same to said dispensing opening during rotation of said shaft;
   means for selectively stopping rotation of said shaft, whereby when rotation of said shaft is stopped by said selective shaft rotation stopping means, seeds, grain and the like are blocked from access to said dispensing opening; and
   said selective shaft rotation stopping means comprises a cam mounted on said shaft, a cam follower mounted to engage said cam, and switch means connected to said follower whereby said switch means is activated when said follower engages a preselected point of said cam.

2. A hopper as in claim 1, wherein:
   said flexible metering means comprises a brush having at least three rows of discrete tufts of flexible bristles, and said brush is mounted on said shaft such that said bristles are slightly bent as said bristles traverse said dispensing opening.

3. A hopper as in claim 2, wherein:
   said shaft is adjustably mounted.

4. A hopper as in claim 2, further comprising:
   at least a second bristled brush mounted on said shaft;
   at least one dividing wall mounted inside said housing to separate said housing into a first compartment and a second compartment;
   a second dispensing opening in said lower portion of said housing;
   one of said dispensing openings and one of said brushes being located inside said first compartment and another of said dispensing openings and another of said brushes being located inside said second compartment.

5. A hopper for dispensing seed, grain and the like, the hopper comprising:
   a housing having a lower portion and at least one dispensing opening in said lower portion;
   a rotatable shaft located within said housing;
   means for rotating said shaft;
   flexible metering means mounted on said shaft above each said dispensing opening for agitating seed, grain and the like and for translocating same to said dispensing opening during rotation of said shaft;
   means for selectively stopping rotation of said shaft, whereby when rotation of said shaft is stopped by said selective shaft rotation stopping means, seeds, grain and the like are blocked from access to said dispensing opening;
   a metering plate having a metering hole formed therethrough;
   wherein said housing has a first side portion and a second side portion extending substantially transversely relative to said lower portion, said first side portion having at least one slot extending therethrough and positioned in alignment with said dispensing opening, said housing further having a bottom portion extending substantially parallel to said lower portion and connected at each end to one of said side portions, said bottom portion having a bottom opening at least as large as and aligned with said dispensing opening; and
   wherein said metering plate extends through said slot and is movable through said slot for varying the degree of alignment between said metering hole and said dispensing opening.

6. A hopper as in claim 5, further comprising:
   means for preventing sliding movement of said metering plate during the dispensing of seed through said dispensing opening;
   means for calibrating the degree of alignment between said dispensing opening and said metering hole; and
   wherein said metering hole is cone-shaped.

7. A hopper as in claim 6, wherein:
   said calibrating means comprises a support plate attached to said bottom portion and having a spacer plate thereon flush with the lower edge of said slot; said calibrating means further comprising a side flange permanently attached atop said spacer plate on one peripheral side edge thereof, said side flange having an indicator mark, said metering plate having a plurality of index marks for aligning with said indicator mark of said side flange.

8. A hopper as in claim 8, wherein:
   said means for preventing sliding movement of said metering plate includes a clip for applying pressure against said metering plate and said support plate.

9. A hopper for dispensing seed, grain or the like, the hopper comprising:
   a housing having a lower portion and at least one dispensing opening in said lower portion;
   a rotatable shaft extending lengthwise inside said housing;
   means for rotating said shaft;
   flexible metering means located along said shaft above each said dispensing opening for moving seeds, grain and the like to said dispensing opening during shaft rotation;
   a cam mounted on said shaft, a cam follower mounted to engage said cam, a microswitch connected to said follower whereby said microswitch is activated when said follower engages a preselected point of said cam, whereby activation of said microswitch deactivates said means for rotating said shaft and stops rotation of said shaft, and whereby when rotation of said shaft is stopped by activation of said microswitch, seeds, grain and the like are blocked from access to each said dispensing opening.

10. A hopper for dispensing seed, grain and the like, the hopper comprising:
    a housing having a lower portion and at least one dispensing opening in said lower portion;
    a rotatable shaft located inside said housing;

means for rotating said shaft;

at least one brush mounted on said shaft and aligned with each said dispensing opening, each said brush having at least one row of discrete tufts of flexible bristles, and said brush being mounted on said shaft such that said bristles are slightly bent as said bristles traverse said dispensing opening;

means for selectively stopping rotation of said shaft at a position such that each said brush blocks access of the seed, grain and the like to each said dispensing opening;

said means for selectively stopping rotation of said shaft comprises:

a cam mounted on said shaft;

a cam follower mounted to engage said cam;

switch means connected to said follower whereby said switch means is activated when said follower engages a preselected point of said cam; and said cam is adjustably mounted on said shaft.

11. A hopper as in claim 10, wherein:

activation of said switch means deactivates said means for rotating said shaft and stops further rotation of said shaft when said bristles of said brush are positioned to block access of any seed, grain or the like to said dispensing opening.

12. A hopper as in claim 11, further comprising:

a metering plate having a metering hole formed therethrough;

a support plate having a spacer plate attached thereon;

a side flange attached atop said spacer plate on one peripheral side edge thereof;

wherein said housing has a first side portion extending substantially transversely from said lower portion, a second side portion extending substantially transversely from said lower portion, and a bottom portion extending substantially parallel to said lower portion and connected at each end to one of said side portions, said bottom portion having a bottom opening at least as large as and aligned with said dispensing opening;

wherein said lower portion has a substantially flat milled grooved portion surrounding said dispensing opening for receiving said metering plate;

wherein at least one of said first side portion and said second side portion has a slot extending therethrough and positioned in alignment with said dispensing opening and said grooved portion of said lower portion; and wherein said metering plate extends through said housing slot and into said groove of said lower portion and between said lower portion and said bottom portion, said metering plate being movable through said housing slot and said groove for varying the degree of alignment between said metering hole and said dispensing opening.

13. A hopper as in claim 12, further comprising:

a support plate attached to said bottom portion and having a spacer plate thereon, the thickness of said spacer plate being equal to the thickness of said bottom portion and having a side flange attached thereon on one peripheral edge thereof;

means for preventing sliding movement of said metering plate during the feeding of seed, grain or the like through said metering hole;

wherein said metering hole is shaped substantially like a cone and said metering plate has a plurality of index marks at one end thereof; and wherein said side flange has an indicator mark for aligning with said index marks of said metering plate.

14. A hopper as in claim 13, wherein:

the larger end of said metering hole has a radius of curvature of approximately one half inch.

* * * * *